United States Patent
Gupta et al.

(10) Patent No.: US 10,452,391 B2
(45) Date of Patent: Oct. 22, 2019

(54) METHOD AND DEVICE FOR MANAGING QUALITY OF A SOFTWARE APPLICATION

(71) Applicants: Shrinath Gupta, Bangalore (IN); Girish Suryanarayana, Bangalore (IN)

(72) Inventors: Shrinath Gupta, Bangalore (IN); Girish Suryanarayana, Bangalore (IN)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/435,492

(22) Filed: Feb. 17, 2017

(65) Prior Publication Data

US 2018/0239600 A1    Aug. 23, 2018

(51) Int. Cl.
*G06F 8/77*    (2018.01)
*G06N 5/00*    (2006.01)

(52) U.S. Cl.
CPC ............... *G06F 8/77* (2013.01); *G06N 5/003* (2013.01)

(58) Field of Classification Search
CPC .. G06F 8/70; G06F 8/77; G06N 5/003; G06N 5/022
See application file for complete search history.

(56) References Cited

U.S. PATENT DOCUMENTS

| | | | |
|---|---|---|---|
| 2011/0276354 A1* | 11/2011 | Bijani | G06Q 10/00 705/7.11 |
| 2012/0260230 A1* | 10/2012 | Choudhary | G06F 11/3616 717/105 |
| 2017/0052867 A1* | 2/2017 | Hannula | G06F 11/3452 |

OTHER PUBLICATIONS

Hneif et al., "Using Guidelines to Improve Quality in Software Nonfunctional Attributes", IEEE Software vol. 28 Issue 6, pp. 72-77 (Year: 2011).*

* cited by examiner

*Primary Examiner* — S. Sough
*Assistant Examiner* — Timothy P Duncan
(74) *Attorney, Agent, or Firm* — Lempia Summerfield Katz LLC

(57) ABSTRACT

A method and system for managing quality of a software application during software development lifecycle is disclosed. In one embodiment, the method includes determining target quality value associated with the software application being developed. Furthermore, the method includes determining parameters affecting quality of the software application. The method also includes determining parameters affecting quality of the software application. Additionally, the method includes outputting results of the analysis indicating real-time quality of the software application being developed.

12 Claims, 10 Drawing Sheets

```
                    ┌─ 400
                    ▼
┌─────────────────────────────────────────────────────┐
│ Generate a quality tree based on the sub-quality    │── 401
│ attribute tree model of the software application    │
└─────────────────────────────────────────────────────┘
                        │
                        ▼
┌─────────────────────────────────────────────────────┐
│ Compute an average value of the sub-quality         │── 402
│ attribute value                                      │
└─────────────────────────────────────────────────────┘
                        │
                        ▼
┌─────────────────────────────────────────────────────┐
│ Retrieve pre-defined guidelines for developing the  │── 403
│ software application from the knowledge database    │
└─────────────────────────────────────────────────────┘
                        │
                        ▼
┌─────────────────────────────────────────────────────┐
│ Assign recommendation to each guideline based on    │── 404
│ the computed aggregate value                         │
└─────────────────────────────────────────────────────┘
```

| Question | Options |
|---|---|
| Is the solution you are developing a framework, library, or a platform that will be used to develop other applications? | ○ No<br>⊙ Yes |
| What is the expected or known duration (in years) of the project? | ⊙ 5-8<br>○ >=17<br>○ 0-4<br>○ 13-16 |
| What is the development platform of the project? | ○ C#<br>○ Java<br>⊙ C++ |
| What is the approximate size of the source code in LoC? | ○ >100k and <1000k<br>○ <15k<br>⊙ >1000k<br>○ >50k and <100k |

Tabs: Request Dashboard | Connect to articrafts | Requirements | Architecture | Design | Code

METHOD AND DEVICE FOR MANAGING QUALITY OF A SOFTWARE APPLICATION

FIELD OF TECHNOLOGY

The present disclosure relates to the field of software application management and more particularly to the field of managing the quality of a software application.

BACKGROUND

The development of the architecture of a software application involves several challenges. One of the many challenges faced by the architects is ensuring the realization of quality attribute requirements of the software application being developed. Some of the quality attribute requirements include performance, maintainability, and security. These quality attribute requirements are prescribed in an architecture specification of the software application.

During the development of the software application, software architecture is defined first based on the product requirements. This is called the prescriptive architecture. The low-level design of the software application is defined using the prescriptive architecture. The low-level design of the software application is further used to develop the code of the software application. The architecture that is reflected in the code is known as the descriptive architecture. However, in several cases, the descriptive architecture as reflected in the code of the software application, does not exhibit properties that are desired in the software application even though the prescriptive architecture appeared correct. This may be because during the process of low-level design and coding, the focus is more on the functional requirements of the software application than on the quality attribute requirements of the software application.

There exists a need to closely monitor the architecture and quality of the software application being developed during the entire software development lifecycle. Moreover, there also exists a need for the architect to know specific guidelines, principles, and approaches that are to be adopted during the development of software architecture to provide the quality requirements of the software are met.

Therefore, the object of the disclosure is to provide a method and a system to manage the quality of a software application during the software development lifecycle.

SUMMARY

A method and system for managing quality of a software application is disclosed. In one aspect, the method includes determining target quality value associated with the software application being developed. The method also includes determining parameters affecting quality of the software application. Furthermore, the method includes analyzing parameters affecting the quality of the software application with respect to the target quality value. Additionally, the method includes outputting results of the analysis indicating real-time quality of the software application being developed.

In another aspect, a system for managing quality of a software application during software development lifecycle includes a processing unit, a knowledge database coupled to the processing unit, and a memory coupled to the processing unit. The memory includes a quality management module configured for determining target quality value associated with the software application being developed. Furthermore, the quality management module is also configured to determine parameters affecting quality of the software application. Additionally, the quality management module is also configured to analyze the parameters affecting the quality of the software application with respect to the target quality value. Moreover, the quality management module is also configured for outputting results of the analysis indicating real-time quality of the software application being developed.

In yet another aspect, a non-transitory computer-readable storage medium having machine readable instructions stored therein, that when executed by the server, causes the server to perform the method acts as described above.

This summary is provided to introduce a selection of concepts in a simplified form that are further described below in the following description. It is not intended to identify features or essential features of the claimed subject matter. Furthermore, the claimed subject matter is not limited to implementations that solve any or all disadvantages noted in any part of this disclosure.

BRIEF DESCRIPTION OF THE DRAWINGS

The present disclosure is further described hereinafter with reference to illustrated embodiments shown in the accompanying drawings, in which:

FIG. 6B illustrates an embodiment of a graphical user interface providing a pre-defined set of questions to elicit quality attribute requirements.

DETAILED DESCRIPTION

Figure 1:
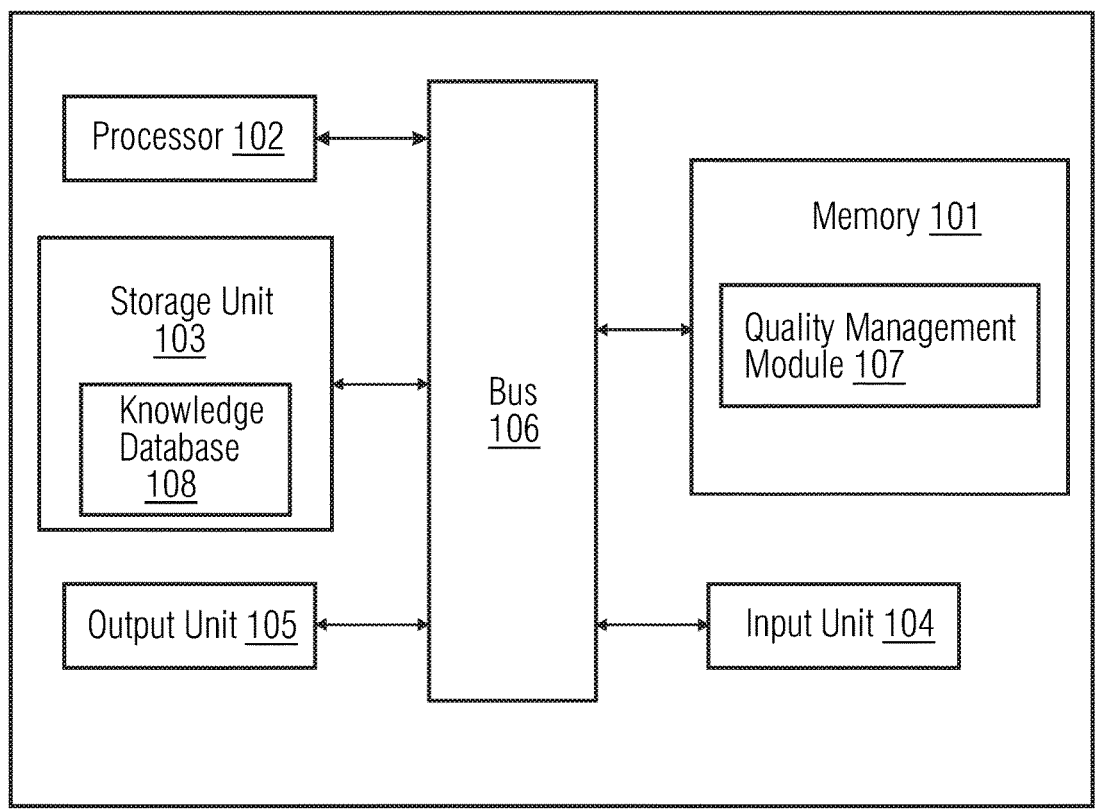
FIG. 1 illustrates a block diagram of a data processing system in which an embodiment for managing the quality of a software application during software development lifecycle may be implemented.

Hereinafter, embodiments of the present disclosure are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details. In other instances, well known materials or methods have not been described in detail in order to avoid unnecessarily obscuring embodiments of the present disclosure. While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the present disclosure.

FIG. 1 is a block diagram of a data processing system 100 in which an embodiment may be implemented, for example, as a system to manage the quality of a software application during software development lifecycle, configured to perform the processes as described therein. In FIG. 1, the data processing system 100 includes a memory 101, a processor 102, a storage unit 103, an input unit 104, an output unit 105, and a bus 106.

The processor 102, as used herein, refers to any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processor 102 may also include embedded controllers, such as generic or programmable logic devices or arrays, application specific integrated circuits, single-chip computers, and the like.

The memory 101 may be volatile memory and non-volatile memory. The memory 101 may be coupled for communication with the processor 102. The processor 102 may execute instructions and/or code stored in the memory 101. A variety of computer-readable storage media may be stored in and accessed from the memory 101. The memory 101 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 101 includes a quality management module 107 stored in the form of machine-readable instructions on any of the above-mentioned storage media and may be in communication to and executed by processor 102. When executed by the processor 102, the quality management module 107 causes the processor 102 to perform acts for managing the quality of a software application. Method acts executed by the processor to achieve the abovementioned functionality are elaborated upon in detail in FIGS. 2, 3, 4 and 5.

The storage unit 103 may be a non-transitory storage medium that stores a knowledge database 108. The knowledge database 108 is a repository of different types of default data such as various weights, thresholds, rules, formulae and multiplication factors relating to the software application being developed. The input unit 104 may include an input device such as keypad, touch-sensitive display, camera (such as a camera receiving gesture-based inputs), or any other device capable of receiving input signal such as a response to a multiple-choice questionnaire to elicit the sub-quality attribute requirements of the software application. The output unit 105 output the results of operations performed by the quality management module 107. For example, the quality management module 107 provides graphical representation of the target quality of the software application using the output unit 105. The output unit 105, via the graphical user interface (GUI), displays information such as a user interface elements such as text fields, buttons, windows, etc., for allowing a user to provide his/her inputs such as the protection units for each of the sections of the power network, etc. The output unit 105 includes, for example, a liquid crystal display, a plasma display, an organic light emitting diode (OLED) based display, etc. The bus 106 acts as interconnect between the processor 102, the memory 101, the storage unit 103, the output unit 105 and the input unit 104.

Those of ordinary skilled in the art will appreciate that the hardware depicted in FIG. 1 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter also may be used in addition or in place of the hardware depicted. The depicted example is provided for explanation only and is not meant to imply architectural limitations with respect to the present disclosure.

A data processing system 100 in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed and/or an event such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

Disclosed embodiments provide systems and methods for software application management. In particular, the systems and methods may perform managing the quality of a software application.

Figure 2:
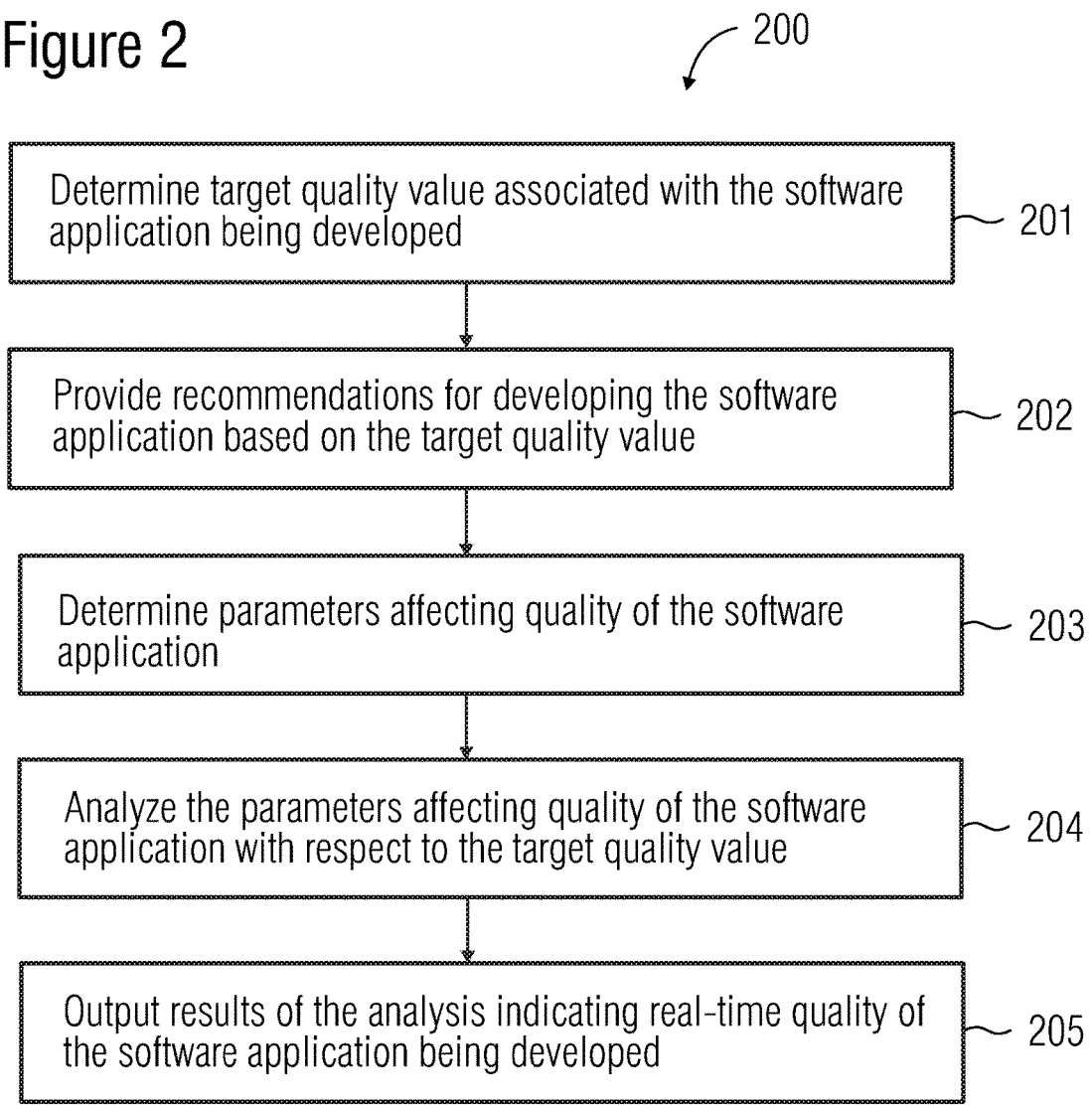
FIG. 2 is a flowchart illustrating an exemplary method of managing quality of a software application during the software development lifecycle.

FIG. 2 illustrates a flowchart of an exemplary method 200 of managing quality of a software application during the software development lifecycle. At act 201, a target quality value associated with the software application being developed is determined. As used herein, a "target quality value" of a software application is the expected quality to be achieved for the software application being developed. The method of determining the target quality value associated with the software application is elaborated upon in detail in FIG. 4. At act 202, based on the determined target quality value, recommendations for developing the software application are provided. The recommendations may be architectural, low-level design, coding, and test-related guidelines for the project based on the target quality value determined for the software application being developed. A set of pre-defined architectural, low-level design, coding and test related guidelines are retrieved from the knowledge database 108 and a recommendation against such guidelines is provided based on the target quality value of the software application. At act 203, one or more parameters affecting the quality of the software application is determined. The one or more parameters may be, for example, architectural, design and/or code smells. At act 204, the parameters affecting the quality of the software application are analyzed with respect to the target quality value of the software application. The impact of the parameters affecting the quality of the software application are rated and compared with the target quality value of the software application. The method of analyzing the parameters affecting quality of the software application with respect to the target quality value is elaborated upon in detail in FIG. 5. At act 205, the results of the analysis are outputted, indicating real-time quality of the software application being developed. The quantification and comparisons may be shown using suitable visualizations like radar chart, spider chart or bar chart.

Figure 3:
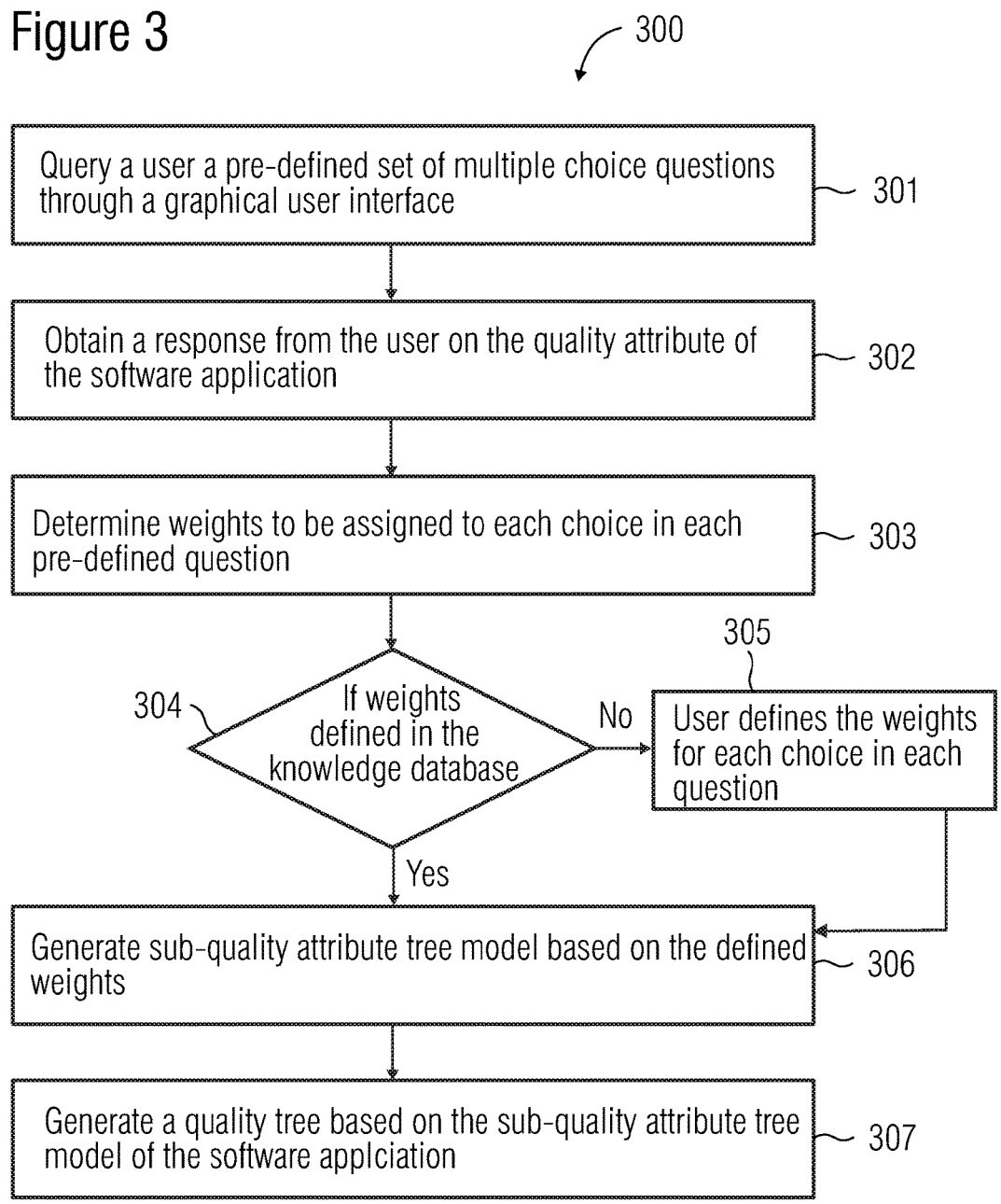
FIG. 3 is a flowchart illustrating an exemplary method of generating a quality tree with one or more sub-quality attributes.

FIG. 3 illustrates a flowchart depicting an exemplary method 300 of generating a quality tree of the software application. At act 301, a user is queried with a pre-defined set of questions through a graphical user interface. The user may be a software development architect. The pre-defined set of questions includes a multiple-choice questionnaire from which the user defines the quality attribute of the software application being developed. FIG. 6B provides an illustration of an example of a graphical user interface 700 for a pre-defined questionnaire presented to the user. In an embodiment, the graphical user interface 700 also includes radio buttons against the options for responses, which may be clicked using a mouse button to choose the preferred response to the question. At act 302, a response to the pre-defined set of questions is obtained from the user through the graphical user interface 700. At act 303, a weight to be assigned to each choice in each pre-defined question is determined. The assigned weights are used in generating a sub-quality attribute tree model for the software application being developed. A sub-quality attribute is quality aspect that defines the main quality attribute of the software application. At act 304, once a response from the user is obtained, the knowledge database 108 is accessed to determine if weights are already defined. In an embodiment, if the weights are not defined in the knowledge database 108, the user is requested to define weights for each choice in each question, at act 305. Based on the user defined weights, a sub-quality attribute tree model is generated at act 306. In an embodiment, if weights are defined in the knowledge database 108, the sub-quality attribute tree is generated based on the weights defined in the knowledge database 108. At act 307, a quality tree based on the sub-quality attribute tree model of the software application is generated. The generated quality tree represents the target quality of the software application being developed.

Figure 6A:
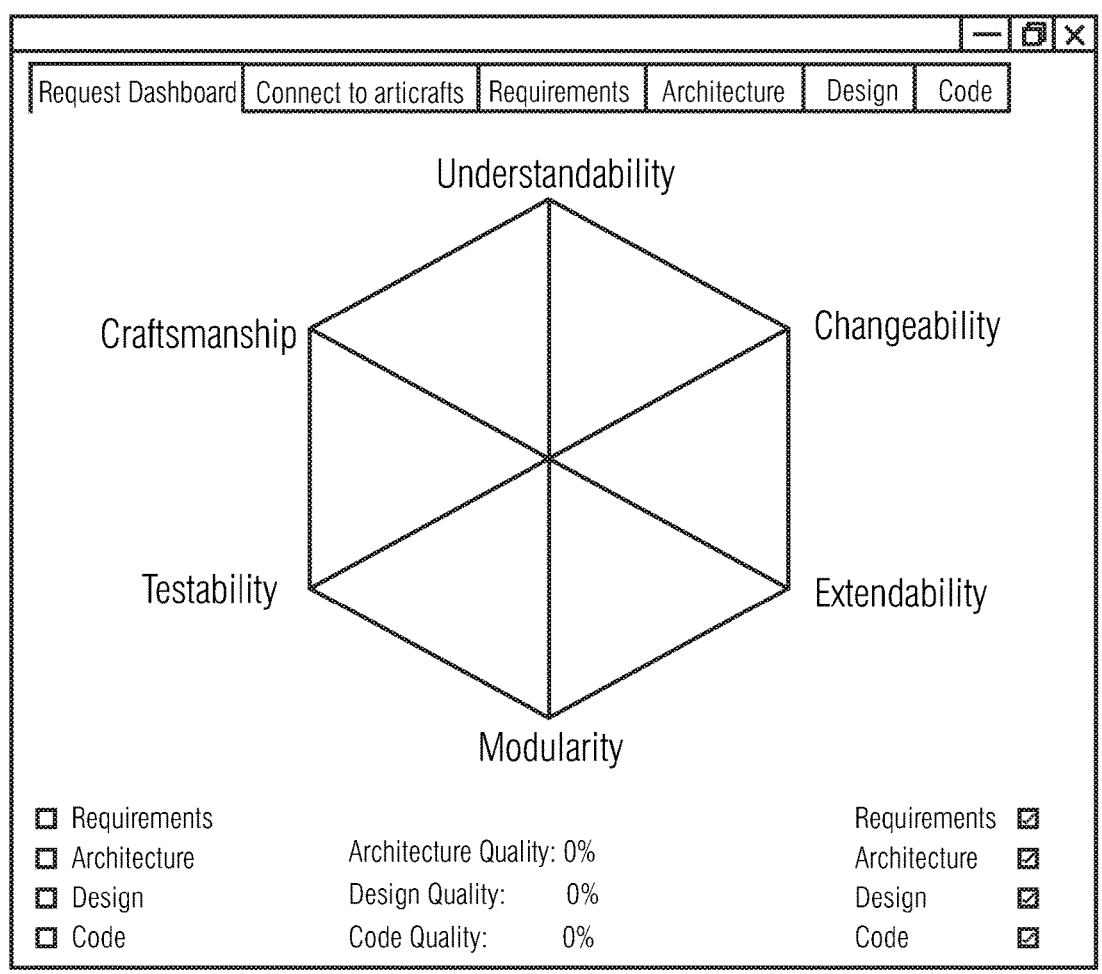
FIG. 6A illustrates an embodiment of a graphical user interface providing a pictorial representation of an empty visualization of the quality attribute requirements.
Figure 6C:
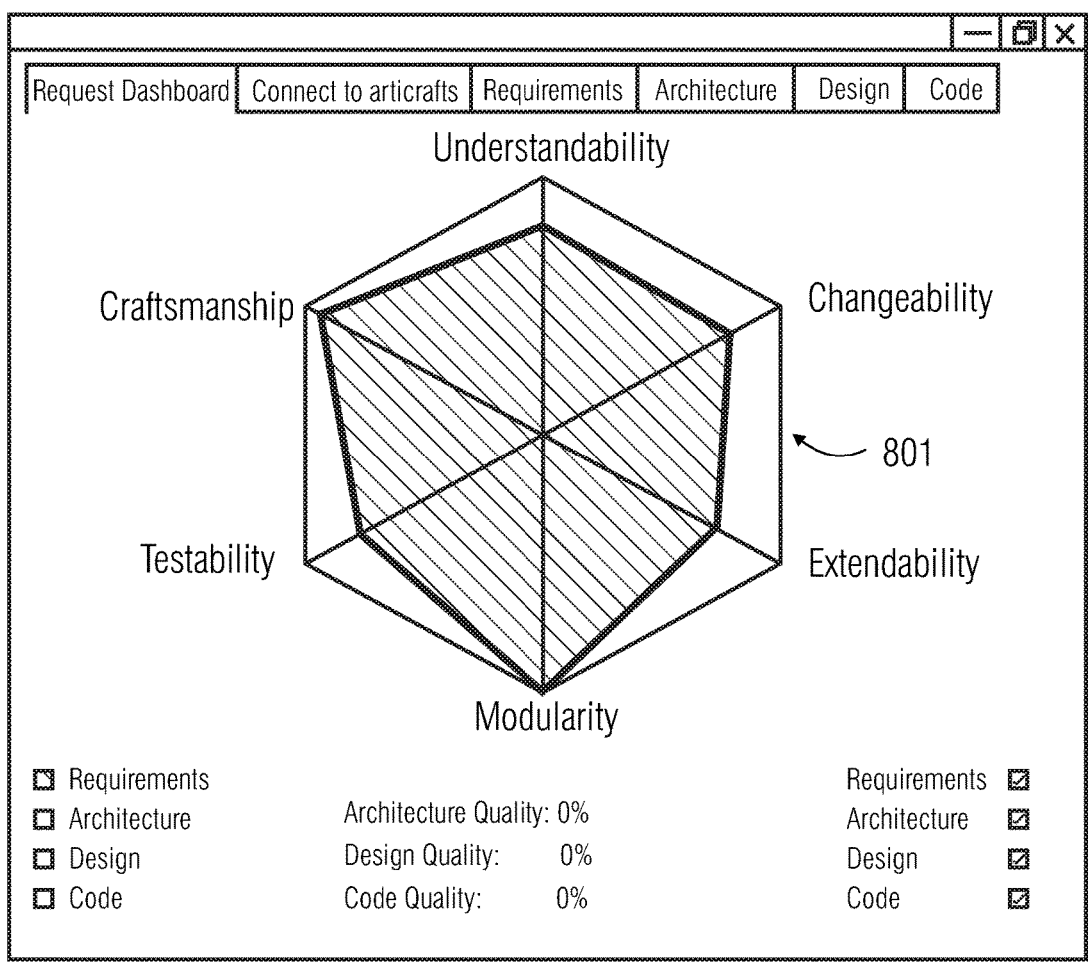
FIG. 6C illustrates an embodiment of a graphical user interface providing a pictorial representation of target quality value of the software application.

FIG. 6A illustrates an example of a graphical user interface 600 depicting an empty visualization of the quality attribute requirements. FIG. 6C illustrates an example of a graphical user interface 800 depicting a quality tree based on the sub-quality attributes of the defined quality attribute. In an embodiment, 801 illustrates a graphical visualization of the sub-quality attributes for 'maintainability' quality attribute. In the embodiment, 801 is a spider chart that includes 'understandability', 'changeability', 'extendibility', 'modularity', 'testability', and 'craftsmanship' as sub-quality attributes. The value of various sub-quality attributes is computed in the range of 0, 1 using the below formula:

$$\text{Sub-quality attribute value} = \frac{\text{value computed by response to questionnaire}}{\text{maximum possible value}}$$

The computed value of each sub-quality attribute is used for generating a graphical visualization of the sub-quality attribute tree model.

Figure 4:
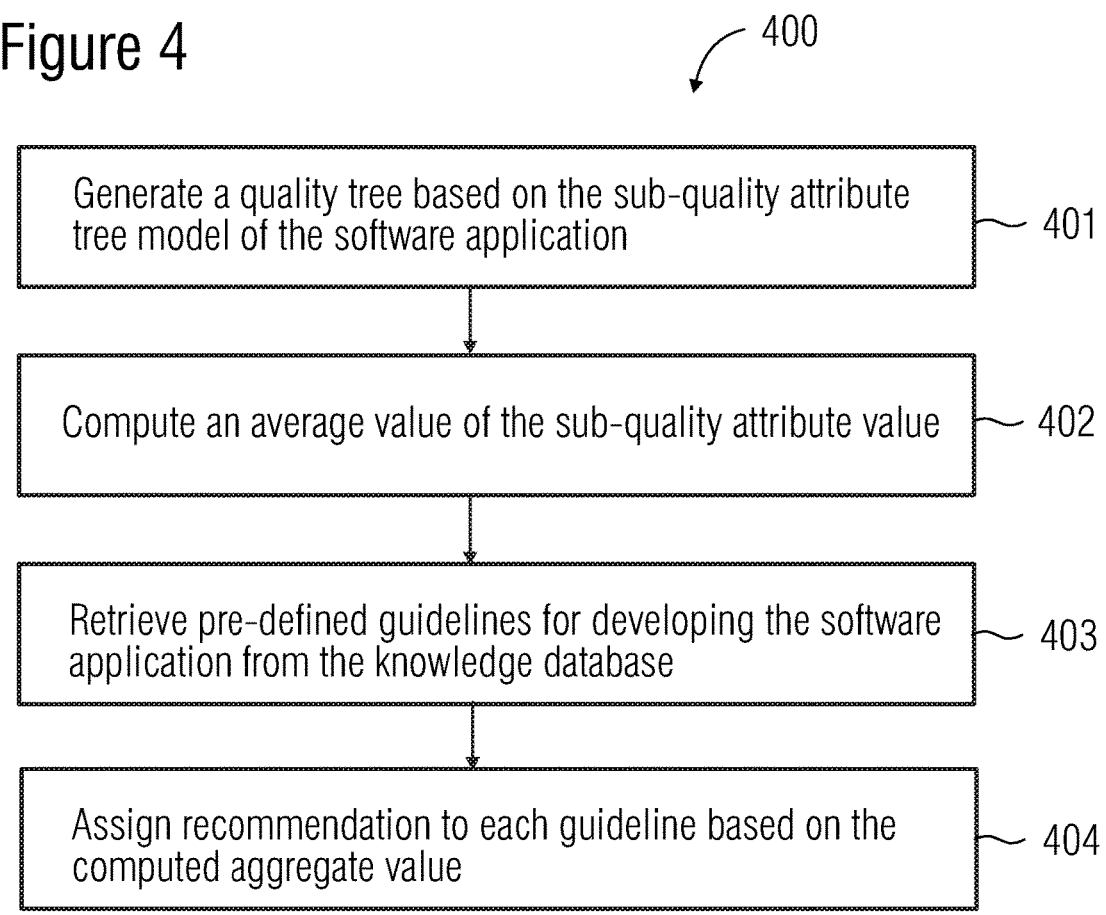
FIG. 4 is a flowchart illustrating an exemplary method of assigning recommendation to guidelines for improving the quality of the software application being developed.

FIG. 4 illustrates a flowchart of an exemplary method 400 for assigning recommendation to guidelines for improving the quality of the software application being developed. At act 401 a quality tree for the software application is generated based on the sub-quality attribute tree model. At act 402, an average value of the sub-quality attribute values and an aggregate value of the quality attribute of the software application is computed. An aggregate value for the quality attribute based on the average sub-quality attribute value may be computed using the below formula:

$$R = \left( \frac{\text{sum of weight of each sub-quality attribute value}}{\text{sum of maximum weight of each sub-quality attribute value}} \right) * 100$$

where R is the aggregate value of the quality attribute of the software application or the target quality value of the software application.

Figure 6D:
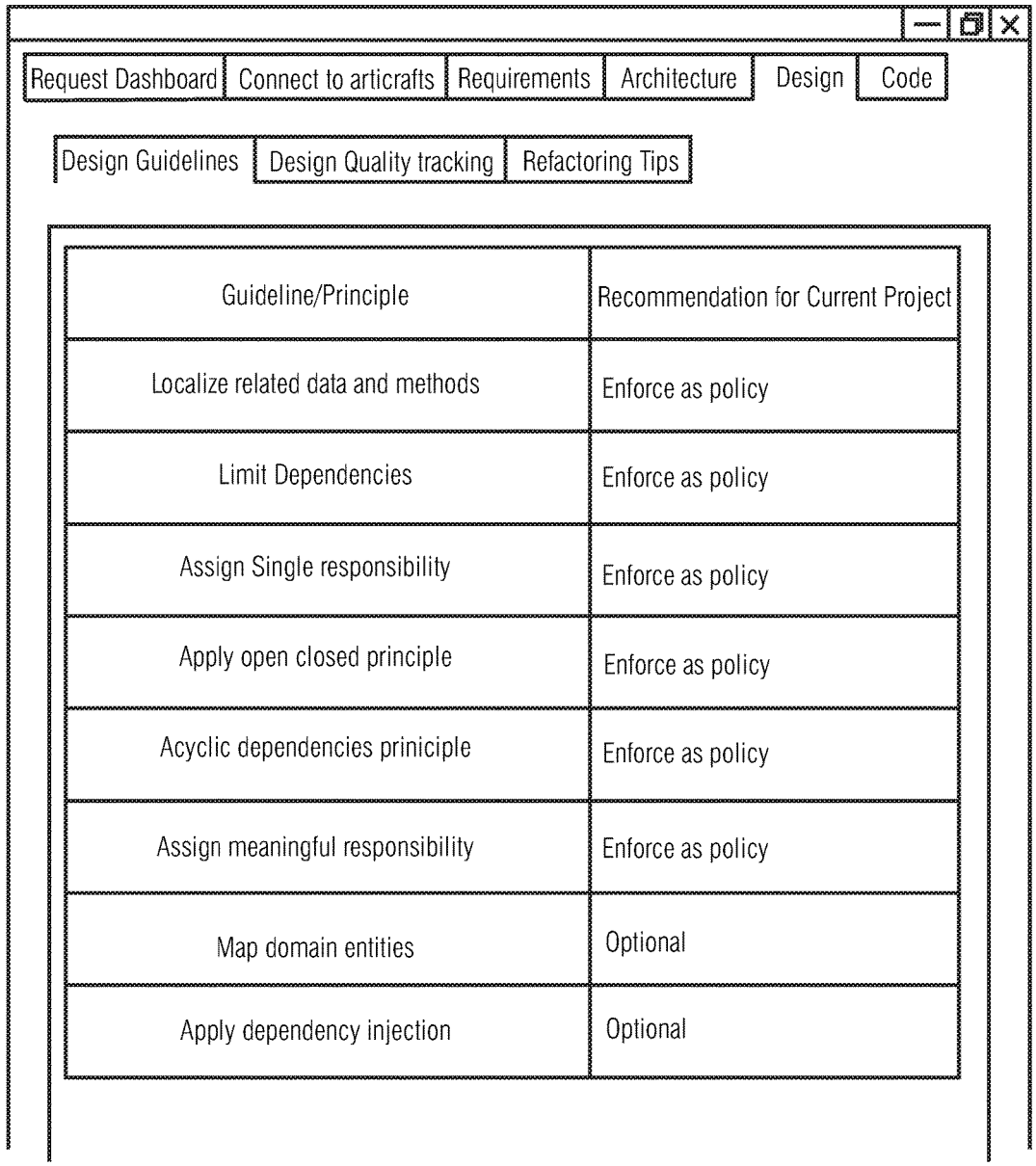
FIG. 6D illustrates an embodiment of a graphical user interface depicting the recommendations for developing the software application.

At act 403, pre-defined guidelines are retrieved from the knowledge database 108 for development of the software application. The pre-defined guidelines provide directions to improve the architectural, design and code-related aspects of the software application being developed. At act 404, a recommendation is assigned to each guideline based on the computed aggregate value of the quality attribute of the software application. In an embodiment, the guidelines are assigned a recommendation of either 'enforce as policy' or 'optional' based on the computed aggregate value of the quality attribute of the software application. FIG. 6D illustrates an example of a graphical user interface 900 depicting guidelines being assigned a recommendation of 'enforce as policy' or 'optional'.

Figure 5:
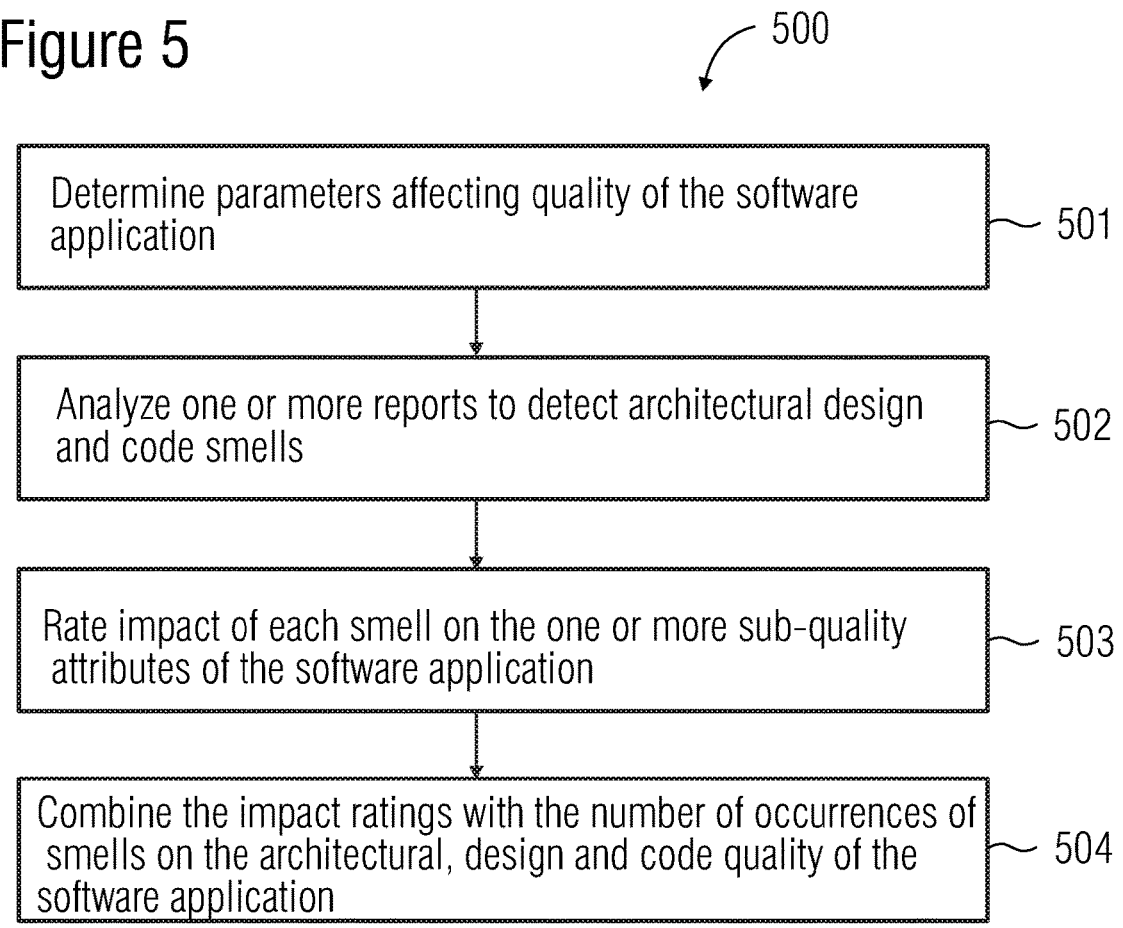
FIG. 5 is a flowchart illustrating an exemplary method of analyzing the parameters affecting the quality of the software application.

FIG. 5 illustrates a flowchart of an embodiment of a method 500 of analyzing the parameters affecting the quality of the software application. At act 501, the parameters affecting the quality of the software application are determined. In an embodiment, the existing project artifacts of the software application, such as architecture models, source code or one or more reports of existing static analyzer tools, are imported to determine the parameters affecting the quality of the software application being developed. At act 502, the one or more reports of the static analyzer tools are analyzed to detect architectural, design and code smells. The impact of each smell on one or more sub-quality attributes of the software application is rated at act 503. The impact is rated based on the user-specified metric thresholds, and formulae for smell computation. User-specified rules and weights are used for computation of quality of the software application. In an embodiment, if no user-specified information exists, the default values for the computation of quality of the software application and computation of smells is retrieved from the knowledge database 108. At act 504, the impact ratings are combined with the number of occurrences of smells on the architectural, design and code quality of the software application to obtain the real-time value of one or more sub-quality attributes of the software application being developed. The following formula is used to compute the real-time value for each sub-quality attribute of the software application being developed based on detected code smells.

$$\text{Temp Value} = \frac{\left(\begin{array}{l}\text{No. of instances of code smell type}\\ 1*\text{impact rating on understandability}\end{array}\right)+ \left(\begin{array}{l}\text{No. of instances of code smell type}\\ 2*\text{impact rating of understandability}\end{array}\right)+..}{(\text{Total no. of types})* \left(\begin{array}{l}\text{Impact of Type 1 smell on understandability}+\\ \text{impact of Type 2 smell on understandability}+..\end{array}\right)}$$

The value of sub-quality attribute 'Understandability' based on code smells is calculated from the computed TempValue as:

Understandability from code smells=1−TempValue

The TempValue is subtracted from 1 because more the number of smells more negatively the sub-quality attribute (here understandability) will be impacted.

The real-time value for each sub-quality attribute of the software application being developed based on detected design smells is computed using the following formula.

$$\text{Temp Value} = \frac{\left(\begin{array}{l}\text{No. of instances of design smell type}\\ 1*\text{impact rating on understandability}\end{array}\right)+ \left(\begin{array}{l}\text{No. of instances of design smell type}\\ 2*\text{impact rating of understandability}\end{array}\right)+..}{(\text{Total no. of types})* \left(\begin{array}{l}\text{Impact of Type 1 smell on understandability}+\\ \text{impact of Type 2 smell on understandability}+..\end{array}\right)}$$

The value of sub-quality attribute 'Understandability' based on design smells is calculated from the computed TempValue as:

Understandability from design smells=1−TempValue

The TempValue is subtracted from 1 because more the number of smells more negatively the sub-quality attribute (here understandability) will be impacted.

To compute the real-time value for each sub-quality attribute of the software application being developed based on detected architectural smells, a similar formula is used:

$$\text{Temp Value} = \frac{\left(\begin{array}{l}\text{No. of instances of architectural smell type}\\ 1*\text{impact rating on understandability}\end{array}\right)+ \left(\begin{array}{l}\text{No. of instances of architectural smell type}\\ 2*\text{impact rating of understandability}\end{array}\right)+..}{(\text{Total no. of namespaces or assemblies})* \left(\begin{array}{l}\text{Impact of Type 1 smell on understandability}+\\ \text{impact of Type 2 smell on understandability}+..\end{array}\right)}$$

The value of sub-quality attribute 'Understandability' based on architectural smells is calculated from the computed TempValue as:

Understandability from architectural smells=1−TempValue

Figure 6E:
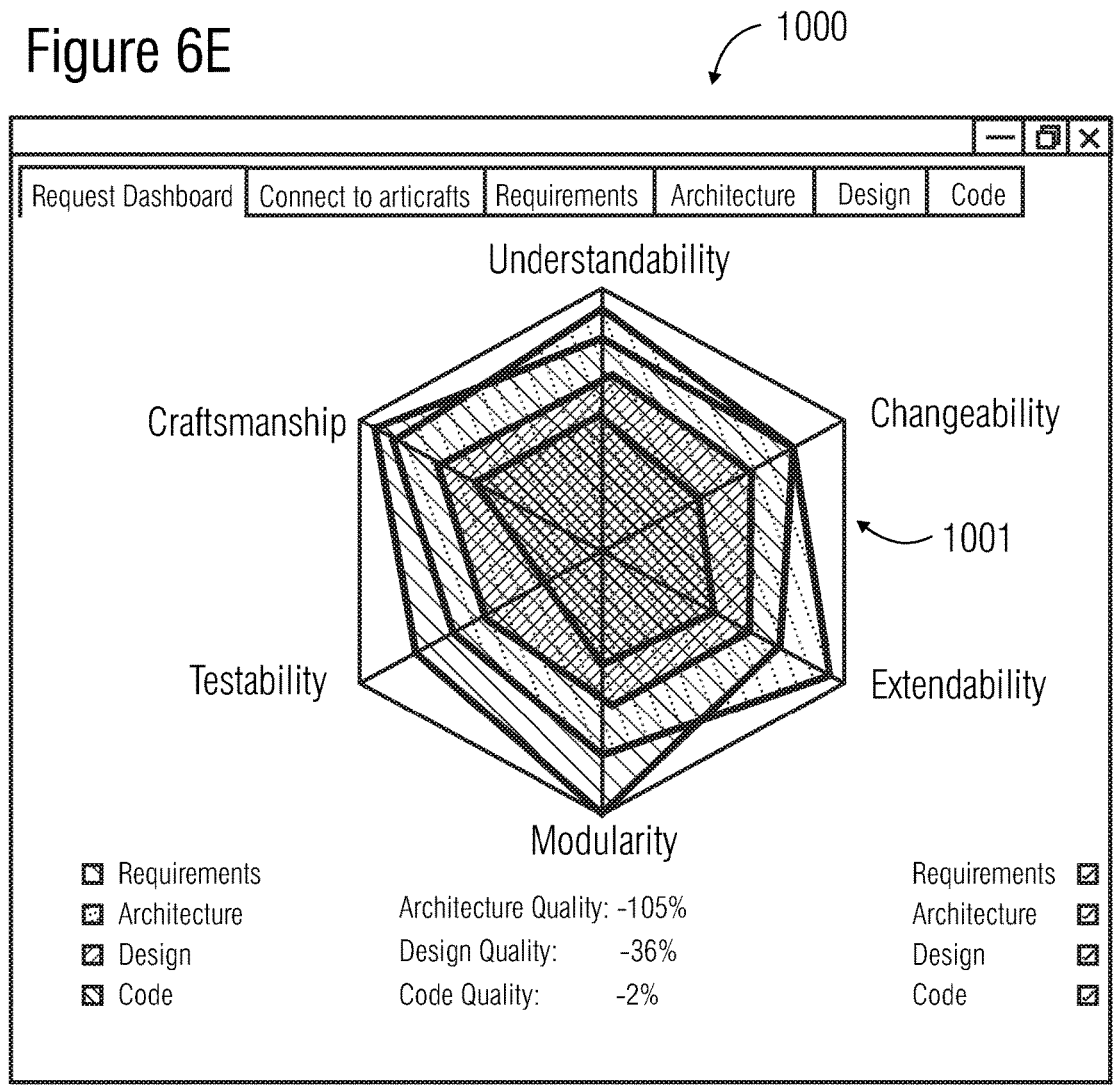
FIG. 6E illustrates an embodiment of a graphical user interface depicting a comparison of quality of architecture, design and code of the software application against target quality value of the software application.

The real-time quality of the software application being developed is determined by comparing the computed real-time value of the sub-quality attributes of the software application with the expected value of the sub-quality attributes of the software application. FIG. 6E provides an illustration of a graphical user interface 1000 depicting a comparison of real-time values of architecture, design and code quality against expected quality of the software application. In an embodiment, 1001 illustrates a graphical representation of the comparison using a spider chart. The comparison allows the user to understand the real-time quality of the software application being developed over the expected quality of the software application. The comparison provides for early detection of quality issues in the software development lifecycle, therefore preventing the requirement of redesigning or re-development of the software application.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

What is claimed is:

1. A method of managing a quality of a software application during a software development lifecycle, the method comprising:
   determining, by a data processing system comprising a processor and memory, a target quality value associated with the software application being developed;
   determining, by the data processing system, parameters affecting the quality of the software application;
   analyzing, by the data processing system, the parameters affecting the quality of the software application with respect to the target quality value, wherein the analyzing comprises calculating a real-time value of one or more sub-quality attributes of the software application being developed, each sub-quality attribute comprising a smell type having one or more architectural smells, one or more design smells, or one or more code smells, wherein the real-time value of each sub-quality attribute is determined based on a number of instances of the smell type and an impact rating of the smell type on the sub-quality attribute;
   comparing, by the data processing system, the real-time values of the one or more sub-quality attributes of the software application with the target quality value of the software application;
   providing recommendations for developing the software application based on the determined target quality value associated with the software application being developed, wherein the providing comprises: computing an average value of sub-quality attribute values; retrieving pre-defined guidelines from a database for the developing of the software application; and assigning a recommendation to each guideline based on the computed average value, wherein each guideline provides directions for improving architectural, design, or code-related aspects of the software application being developed; and outputting, by the data processing system, a real-time quality of the software application comprising a quantified quality value of the software application and refactoring suggestions for improving the quality of the software application based on the comparison of the real-time values of the one or more sub-quality attributes of the software application with the target quality value of the software application.

2. The method of claim 1, wherein the determining of the target quality value associated with the software application comprises:

generating a quality tree comprising one or more sub-quality attributes of the software application;

computing an aggregate value of the one or more sub-quality attributes; and determining the target quality value associated with the software application based on the aggregate value of the one or more sub-quality attributes.

3. The method of claim 2, wherein the generating of the quality tree comprises:

querying a user a pre-defined set of questions through a graphical user interface to elicit sub-quality attribute requirements;

obtaining a response from the user on the sub-quality attribute requirements;

quantifying a sub-quality attribute value based on the response obtained from the user; and updating the quality tree based on the response obtained from the user.

4. The method of claim 1, wherein the analyzing of the parameters comprises:

analyzing one or more reports to detect the architectural, design, and code smells based on pre-defined metric thresholds and formulae;

rating an impact of each smell on the one or more sub-quality attributes of the software application based on pre-defined weights and rules for computation of the quality of the software application; and combining the impact ratings with a number of occurrences of smells to quantify the impact of the smells on the quality of the software application.

5. A system for managing a quality of a software application during a software development lifecycle, the system comprising:

a processing unit;

a knowledge database coupled to the processing unit;

a memory coupled to the processing unit, the memory comprising a quality management module configured to:

determine a target quality value associated with the software application being developed;

determine parameters affecting the quality of the software application;

analyze the parameters affecting the quality of the software application with respect to the target quality value, wherein the analysis comprises calculating a real-time value of one or more sub-quality attributes of the software application being developed, each sub-quality attribute comprising a smell type having one or more architectural smells, one or more design smells, or one or more code smells, wherein the real-time value of each sub-quality attribute is determined based on a number of instances of the smell type and an impact rating of the smell type on the sub-quality attribute;

compare the real-time values of the one or more sub-quality attributes of the software application with the target quality value of the software application;

provide recommendations for developing the software application based on the determined target quality value associated with the software application being developed, wherein the providing comprises: computing an average value of sub-quality attribute values; retrieving pre-defined guidelines from the knowledge database for the developing of the software application; and assigning a recommendation to each guideline based on the computed average value, wherein each guideline provides directions for improving architectural, design, or code-related aspects of the software application being developed; and output a real-time quality of the software application being developed comprising a quantified quality value of the software application and refactoring suggestions for improving the quality of the software application based on the comparison of the real-time values of the one or more sub-quality attributes of the software application with the target quality value of the software application.

6. The system of claim 5, wherein, in the determining of the target quality value associated with the software application, the quality management module is configured to:

generate a quality tree comprising one or more sub-quality attributes of the software application;

compute an aggregate value of the one or more sub-quality attributes; and determine the target quality value associated with the software application based on the aggregate value of the one or more sub-quality attributes.

7. The system of claim 6, wherein in the generating of the quality tree, the quality management module is configured to:

query a user a pre-defined set of questions through a graphical user interface to elicit sub-quality attribute requirements;

obtain a response from the user on the sub-quality attribute requirements;

quantify a sub-quality attribute value based on the response obtained from the user; and update the quality tree based on the response obtained from the user.

8. The system of claim 6, wherein, in the analyzing of the parameters affecting the quality of the software application, the quality management module is configured to:

analyze the one or more reports to detect the architectural, design, and code smells based on pre-defined metric thresholds and formulae;

rate an impact of each smell on the one or more sub-quality attributes of the software based on pre-defined weights and rules for computation of the quality of the software application; and combine the impact ratings with a number of occurrences of smells to quantify the impact of the smells on the quality of the software application.

9. A non-transitory computer-readable storage medium having machine-readable instructions stored therein, that when executed by a server, cause the server to perform at least the following:

determine a target quality value associated with a software application being developed;
determine parameters affecting a quality of the software application;
analyze the parameters affecting the quality of the software application with respect to the target quality value, wherein the analysis comprises calculating a real-time value of one or more sub-quality attributes of the software application being developed, each sub-quality attribute comprising a smell type having one or more architectural smells, one or more design smells, or one or more code smells, wherein the real-time value of each sub-quality attribute is determined based on a number of instances of the smell type and an impact rating of the smell type on the sub-quality attribute;
compare the real-time values of the one or more sub-quality attributes of the software application with the target quality value of the software application;
provide recommendations for developing the software application based on the determined target quality value associated with the software application being developed, wherein the providing comprises: computing an average value of sub-quality attribute values; retrieving pre-defined guidelines from a database for the developing of the software application; and assigning a recommendation to each guideline based on the computed average value, wherein each guideline provides directions for improving architectural, design, or code-related aspects of the software application being developed; and
output a real-time quality of the software application being developed comprising a quantified quality value of the software application and refactoring suggestions for improving the quality of the software application based on the comparison of the real-time values of the one or more sub-quality attributes of the software application with the target quality value of the software application.

10. The storage medium of claim 9, wherein, in the determining of the target quality value associated with the software application, the instructions cause the server to perform at least the following:
generate a quality tree comprising one or more sub-quality attributes of the software application;
compute an aggregate value of the one or more sub-quality attributes; and
determine the target quality value associated with the software application based on the aggregate value of the one or more sub-quality attributes.

11. The storage medium of claim 10, wherein, in the generating of the quality tree, the instructions cause the server to perform at least the following:
query a user a pre-defined set of questions through a graphical user interface to elicit sub-quality attribute requirements;
obtain a response from the user on the sub-quality attribute requirements;
quantify a sub-quality attribute value based on the response obtained from the user; and
update the quality tree based on the response obtained from the user.

12. The storage medium of claim 10, wherein in the analyzing of the parameters affecting the quality of the software application, the instructions cause the server to perform at least the following:
analyze the one or more reports to detect the architectural, design, and code smells based on pre-defined metric thresholds and formulae;
rate an impact of each smell on the one or more sub-quality attributes of the software based on pre-defined weights and rules for computation of quality of the software application; and
combine the impact ratings with the number of occurrences of smells to quantify the impact of the smells on the quality of the software application.

* * * * *